US010033916B2

(12) United States Patent
Thanigasalam (10) Patent No.: US 10,033,916 B2
(45) Date of Patent: Jul. 24, 2018

(54) TRANSMISSION OF IMAGE DATA AND CAMERA MANAGEMENT COMMANDS

(71) Applicant: Intel Corporation, Santa Clara, CA (US)

(72) Inventor: Haran Thanigasalam, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 15/232,881

(22) Filed: Aug. 10, 2016

(65) Prior Publication Data

US 2017/0359499 A1     Dec. 14, 2017

Related U.S. Application Data

(60) Provisional application No. 62/349,923, filed on Jun. 14, 2016.

(51) Int. Cl.
*H04N 5/225*     (2006.01)
*H04N 5/232*     (2006.01)
*G06F 8/65*     (2018.01)

(52) U.S. Cl.
CPC ........ *H04N 5/23206* (2013.01); *G06F 8/65* (2013.01)

(58) Field of Classification Search
CPC .................................................. H04N 5/232
USPC ......................................... 348/207.1, 207.11
See application file for complete search history.

(56) References Cited

U.S. PATENT DOCUMENTS

| | | | | |
|---|---|---|---|---|
| 5,990,469 A | * | 11/1999 | Bechtel | B60Q 1/1423 250/208.1 |
| 9,755,818 B2 | * | 9/2017 | Sengoku | H04L 7/0087 |
| 2002/0171741 A1 | | 11/2002 | Tonkin et al. | |
| 2003/0133448 A1 | * | 7/2003 | Frink | H04N 21/43615 370/389 |
| 2011/0143811 A1 | * | 6/2011 | Rodriguez | G06K 9/00986 455/556.1 |
| 2012/0026342 A1 | * | 2/2012 | Yu | H04N 5/77 348/207.1 |
| 2013/0021953 A1 | | 1/2013 | Yilmazer et al. | |
| 2014/0247355 A1 | | 9/2014 | Ihlenburg | |
| 2014/0313360 A1 | * | 10/2014 | Lee | H04N 5/23229 348/218.1 |
| 2014/0354527 A1 | * | 12/2014 | Chen | G06F 3/017 345/156 |

(Continued)

FOREIGN PATENT DOCUMENTS

JP     S6253034 A     3/1987

OTHER PUBLICATIONS

PCT International Search Report, PCT Application No. PCT/US2017/030964, dated Aug. 17, 2017, 3 pages.

(Continued)

*Primary Examiner* — Anthony J Daniels
(74) *Attorney, Agent, or Firm* — International IP Law Group, P.L.L.C.

(57) ABSTRACT

In one example, a system for modifying transmission of image data includes a processor to detect a camera management command to transmit to an image sensor via a camera serial interface link. The processor can also transmit the camera management command to the image sensor via the camera serial interface link, and receive image data from the image sensor via the camera serial interface link.

22 Claims, 9 Drawing Sheets

300

(56) References Cited

U.S. PATENT DOCUMENTS

2017/0116150 A1* 4/2017 Wiley ................ G06F 13/4282

OTHER PUBLICATIONS

Thanigasalam, Haran, U.S. Appl. No. 62/166,623, filed in the USPTO May 26, 2015, U.S. Application, Drawings, E-Ack Receipt, and Filing Receipt attached 32 pages, not yet published.
Thanigasalam, Haran, PCT Application Serial No. PCT/US2016/033975, Filed in the USPTO May 24, 2016, PCT Application, Drawings, E-Ack Receipt, and Filing Receipt attached 54 pages, not yet published.

* cited by examiner

TRANSMISSION OF IMAGE DATA AND CAMERA MANAGEMENT COMMANDS

CROSS-REFERENCE TO RELATED APPLICATIONS

This application claims the benefit of U.S. Provisional Patent Application Ser. No. 62/349,923, filed on Jun. 14, 2016, titled "Transmission of Image Data and Camera Management Commands," the contents of which are incorporated by reference as if set forth in their entirety herein for all of these applications.

TECHNICAL FIELD

This disclosure relates generally to transmitting image data and specifically, but not exclusively, to enabling a transmission link to transmit image data and camera management commands.

BACKGROUND

Computing devices and digital cameras are incorporating an increasing number of auxiliary sensors that operate in conjunction with an image sensor to capture image data corresponding to digital photographs. As a result, processors in the computing devices and digital cameras can transmit various complex management commands, firmware updates, and the like, to the auxiliary sensors and the image sensor. For example, the processors can use dedicated bidirectional links to transfer the management commands and firmware updates, while receiving image data captured by the image sensor via a separate unidirectional link.

BRIEF DESCRIPTION OF THE DRAWINGS

The following detailed description may be better understood by referencing the accompanying drawings, which contain specific examples of numerous features of the disclosed subject matter.

In some cases, the same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Many processors and image sensors transmit image data using a unidirectional data link and a separate bidirectional command link for additional data such as firmware updates, camera management commands, and the like. The techniques described herein enable transmitting sensor image data and camera management commands via a single bidirectional serial interface data link. Thus, the techniques described herein may alleviate the need for an extra 2-wire bidirectional camera command interface. The techniques described herein may also result in cost savings, may reduce the number of pins on image sensors and application processors, may eliminate the need for an additional cable for transmitting camera management commands over a low bandwidth multi-master, multi-slave, single-ended serial interface (such as I2C interface), and may alleviate the need for camera management commands over I2C redrivers and retimers for products requiring long reach (i.e. IoT, Automotive, Drones, Industrial applications). In some embodiments, the techniques described herein can also provide a pathway for secure transactions (i.e. using virtual channel based encryption) and may prevent malicious attacks that, for example, may involve hijacking camera management commands over an I2C channel. Further, the techniques described herein may improve performance by permitting the uploading of firmware or initiating firmware modifications corresponding to an image sensor.

The techniques described herein include detecting a camera management command to transmit to an image sensor via a camera serial interface link and transmitting the camera management command to the image sensor via the camera serial interface link. A camera management command, as referred to herein, can include a read operation, a write operation, a firmware update, a modification to a setting of the image sensor or an auxiliary sensor, and the like. The techniques further include receiving image data from the image sensor via the camera serial interface link. In some examples, camera management commands can be transmitted from a processor to an image sensor during natural blanking intervals or idle cycles between transferring horizontal rows of image data (i.e. horizontal blanking), and between transferring frames (i.e. vertical blanking) using a camera serial interface.

Reference in the specification to "one embodiment" or "an embodiment" of the disclosed subject matter means that a particular feature, structure, or characteristic described in connection with the embodiment is included in at least one embodiment of the disclosed subject matter. Thus, the phrase "in one embodiment" may appear in various places throughout the specification, but the phrase may not necessarily refer to the same embodiment.

Figure 1:
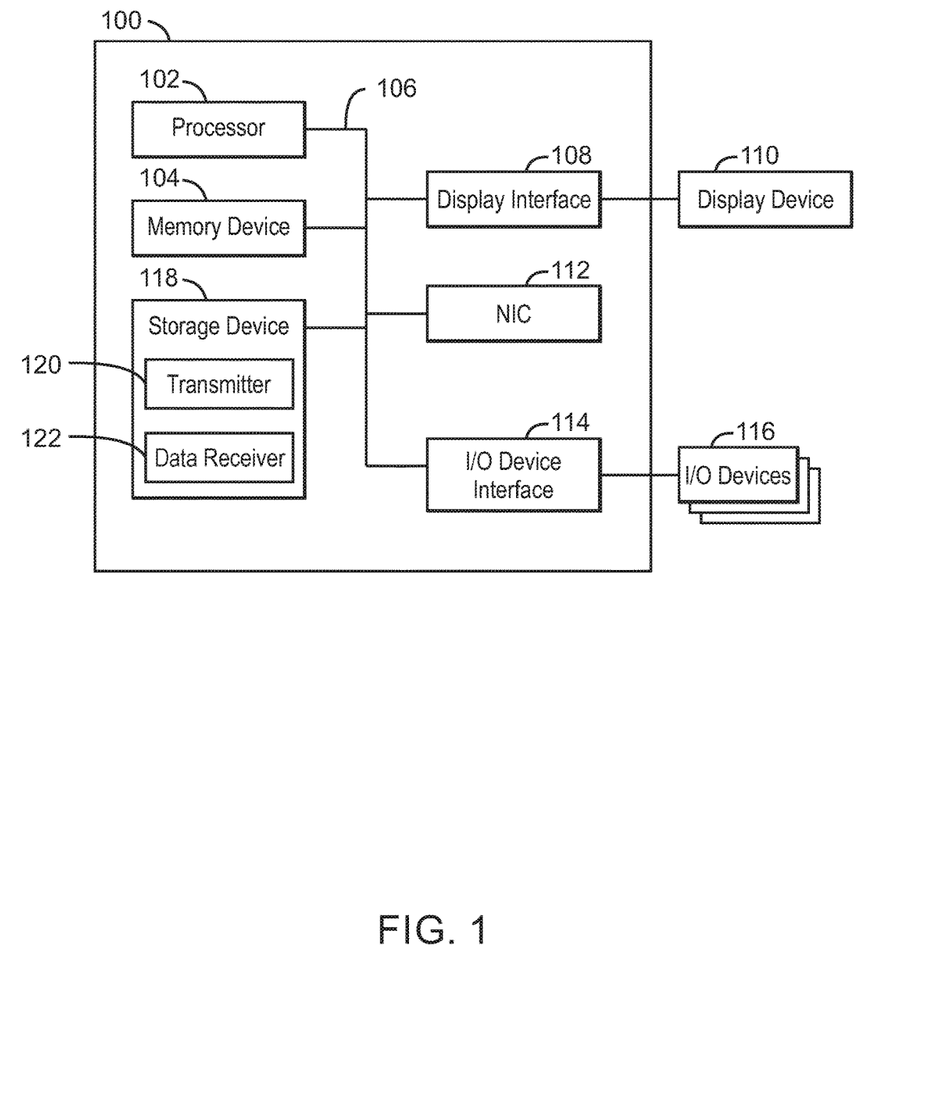
FIG. 1 illustrates a block diagram of a computing device that can transmit image data and camera management commands.

FIG. 1 is a block diagram of an example of a host computing device that can transmit image data and camera management commands. The host computing device 100 may be, for example, a mobile phone, laptop computer, desktop computer, or tablet computer, among others. The host computing device 100 may include a processor 102 that is adapted to execute stored instructions, as well as a memory device 104 that stores instructions that are executable by the processor 102. The processor 102 can be a single core processor, a multi-core processor, a computing cluster, or any number of other configurations. The memory device 104 can include random access memory, read only memory, flash memory, or any other suitable memory systems. The instructions that are executed by the processor 102 may be used to implement a method that can transmit image data and camera management commands.

The processor 102 may also be linked through the system interconnect 106 (e.g., PCI®, PCI-Express®, NuBus, etc.) to a display interface 108 adapted to connect the host computing device 100 to a display device 110. The display device 110 may include a display screen that is a built-in component of the host computing device 100. The display device 110 may also include a computer monitor, television, or projector, among others, that is externally connected to the host computing device 100. The display device 110 can include light emitting diodes (LEDs), and micro-LEDs, among others.

In addition, a network interface controller (also referred to herein as a NIC) 112 may be adapted to connect the host computing device 100 through the system interconnect 106 to a network (not depicted). The network (not depicted) may be a cellular network, a radio network, a wide area network (WAN), a local area network (LAN), or the Internet, among others.

The processor 102 may be connected through a system interconnect 106 to an input/output (I/O) device interface 114 adapted to connect the computing host device 100 to one or more I/O devices 116. The I/O devices 116 may include, for example, a keyboard and a pointing device, wherein the pointing device may include a touchpad or a touchscreen, among others. The I/O devices 116 may be built-in components of the host computing device 100, or may be devices that are externally connected to the host computing device 100.

In some embodiments, the processor 102 may also be linked through the system interconnect 106 to a storage device 118 that can include a hard drive, an optical drive, a USB flash drive, an array of drives, or any combinations thereof. In some embodiments, the storage device 118 can include any suitable applications. In some embodiments, the storage device 118 can include a transmitter 120 and a data receiver 122. The transmitter 120 can detect a camera management command to transmit to an image sensor via a camera serial interface link. In some embodiments, the transmitter 120 can also transmit the camera management command to the image sensor via the camera serial interface link. In some examples, the data receiver 122 can receive image data from the image sensor via the camera serial interface link. Accordingly, the transmitter 120 and the data receiver 122 can send and receive data corresponding to an image sensor using a single camera serial interface link. In some examples, the camera serial interface link can include any suitable number of bidirectional lanes, unidirectional lanes, or any combination thereof.

It is to be understood that the block diagram of FIG. 1 is not intended to indicate that the host computing device 100 is to include all of the components shown in FIG. 1. Rather, the host computing device 100 can include fewer or additional components not illustrated in FIG. 1 (e.g., additional memory components, embedded controllers, additional modules, additional network interfaces, etc.). Furthermore, any of the functionalities of the transmitter 120 and data receiver 122 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the transmitter 120 and data receiver 122 can be implemented with logic, wherein the logic, as referred to herein, can include any suitable hardware (e.g., a processor, among others), software (e.g., an application, among others), firmware, or any suitable combination of hardware, software, and firmware.

Figure 2:
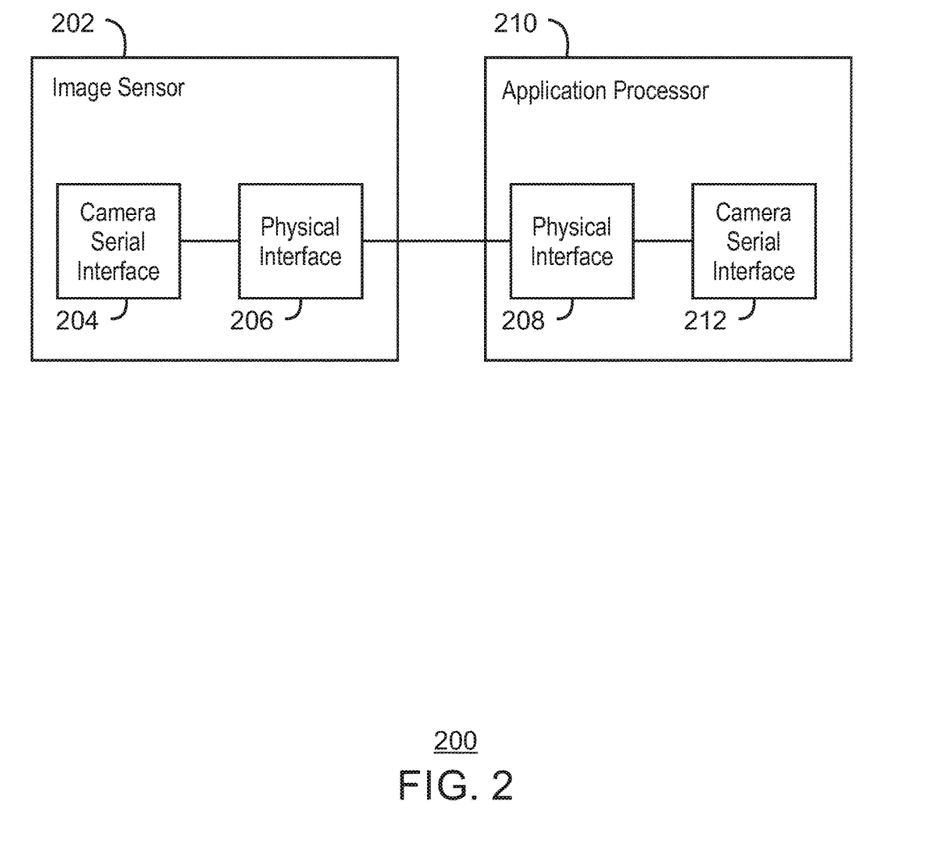
FIG. 2 illustrates a process flow diagram for transmitting the image data and camera management commands.

FIG. 2 illustrates a block diagram of an example image sensor transmitting image data and camera management commands. In some embodiments, the image sensor 202 can include a camera serial interface 204 and a physical interface 206. The camera serial interface 204 can communicate with the physical interface 206 using any suitable protocol such as a PHY protocol interface (also referred to herein as PPI), among others. In some examples, the physical interface 206 can transmit image data to a physical interface 208 of an application processor 210. The physical interface can specify a transmission medium, input/output circuitry, and a clocking mechanism to enable capturing a data packet comprising the camera management command or the image data. An application processor, as referred to herein, can include any number of processors, circuits, logic, system on a chip, and the like that can generate, detect, and transmit camera management commands and capture image data from the image sensor 202. In some embodiments, the physical interface 208 of the application processor 210 can transmit data to a camera serial interface 212 using any suitable protocol such as a PHY protocol interface, and the like.

In some embodiments, the camera serial interface 212 of the application processor 210 operates as a master device and the camera serial interface 204 of the image sensor 202 operates as a slave device. The camera serial interface 212 of the application processor 210 can transmit any number of camera management commands to the camera serial interface 204 of the image sensor 202 using the protocol recognized by the physical interfaces 206 and 208. In some embodiments, the physical interfaces 206 and 208 can transmit camera management commands from the application processor 210 to the image sensor 202 and image data from the image sensor 202 to the application processor 210.

It is to be understood that the block diagram of FIG. 2 is not intended to indicate that the image sensor 202 and the application processor 210 are to include all of the components shown in FIG. 2. Rather, the image sensor 202 and the application processor 210 can include fewer or additional components not illustrated in FIG. 2 (e.g., additional memory components, embedded controllers, additional sensors, additional interfaces, etc.). For example, in some embodiments, the physical interfaces 206 and 208 can be connected with separate unidirectional data lanes dedicated to transmitting data from the image sensor 202 to the application processor 210 (also referred to herein as a forward mode) or from the application processor 210 to the image sensor 202 (also referred to herein as a reverse mode). In other examples, the data lanes that connect the physical interfaces 206 and 208 are bidirectional and can transmit data in a forward mode and a reverse mode.

Figure 3:
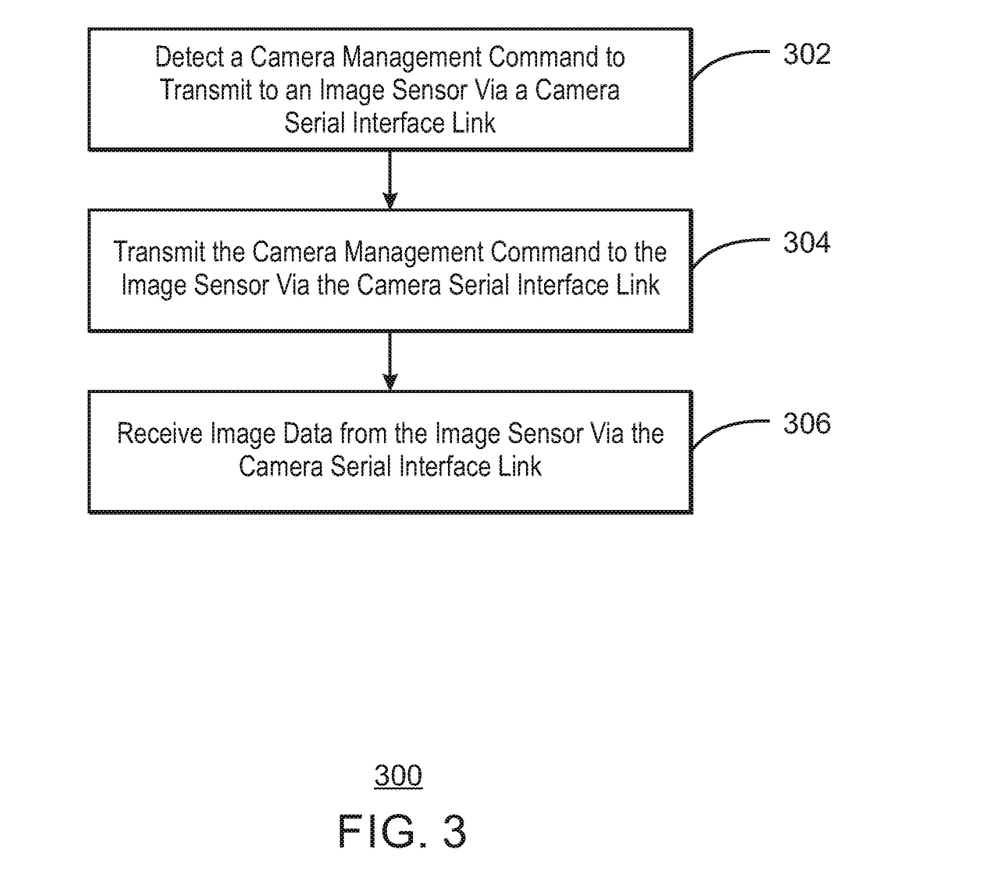
FIG. 3 illustrates a process flow diagram for transmitting image data and camera management commands via a single camera serial interface link.

FIG. 3 illustrates a process flow diagram for transmitting image data and camera management commands via a single camera serial interface link. The method 300 illustrated in FIG. 3 can be implemented with any suitable computing component or device, such as the computing device 100 of FIG. 1. a1

At block 302, the transmitter 120 can detect a camera management command to transmit to an image sensor via a camera serial interface link. For example, the camera management command can include any suitable read command, write command, firmware update command, auxiliary sensor command, and the like. An auxiliary sensor, as referred to herein, can include any suitable sensor, such as a gyroscope, an optical image stabilization sensor, an auto focus sensor, radar, and an ultrasonic sensor, among others, that can modify settings used by an image sensor to capture image data. For example, the auxiliary sensors can modify the exposure time corresponding to an image sensor, a focal point of the image sensor, and the like. In some embodiments, the camera management commands can correspond to a single write to a random location, a single write to a current location, a single read from random location, a single read from a current location, a sequential read operation from random locations, and a sequential read operation from a current location. In some embodiments, the transmitter 120 can bundle any number of camera management commands into a single data packet or sequential data packets.

At block 304, the transmitter 120 can transmit the camera management command to the image sensor via the camera serial interface link. In some embodiments, the transmitter 120 can embed the camera management command in a data packet. For example, the transmitter 120 may generate data packets based on a D-PHY interface or a C-PHY interface. For example, the transmitter 120 may generate packets to be transmitted using a bidirectional differential interface comprising a two-wire clock lane and one or more two-wire data lanes or a bidirectional differential interface comprising one or more two-wire data lanes. The transmitter 120 can modify the packet header information for data packets to be transmitted using either the D-PHY interface or the C-PHY interface. In some examples, the transmitter 120 can modify virtual channel bits, unused reserved bits, or unused data type bits in the packet header. For example, the transmitter 120 can modify a legacy reserved data type field so that a value from the reserved data type field indicates that the data packet corresponds to a camera management command or image data. In some embodiments, there are two flags or bits that distinguish the camera management commands from image data. For example, the flags can indicate that a data packet corresponds to a camera management command or a negative acknowledgment that indicates a camera management command generated an error during execution. The two flags may be mapped to existing camera serial interface over D-PHY or C-PHY spare reserved bits. Alternatively the two flags may be mapped to reserved data type bits available in a camera serial interface over D-PHY and C-PHY imaging conduits. In some embodiments, an image sensor can generate the negative acknowledgment for any camera management command such as a write command, read command, and the like. The negative acknowledgment can include the camera management command with a packet header modified to indicate the camera management command failed to be executed by the image sensor. The packet header can be modified to use a reserved bit, a virtual channel bit, or unused data type bits to indicate the negative acknowledgment.

In some embodiments, the camera management commands are mapped into camera management command packets illustrated in FIGS. 6 and 7 below. In some embodiments, the camera management commands use byte-wise operations that include any suitable bit filler, such as 8'h00 filler, to ensure lane alignment in a data link of the physical interfaces. The 8'h00 filler can ensure 16 bit (or wider) data paths are properly aligned. The 16 bit word count for camera management commands can map to byte-wise size of the camera management commands content in long packet data.

In some embodiments, the camera management commands reuse 16 cyclical redundancy check (CRC) data to preserve channel integrity for the physical interfaces. In some embodiments, the camera management commands do not use a start bit, stop bit, or an acknowledgment bit. In some embodiments, a camera management command packet for reverse mode use between the processor and the image sensor includes write data and a sub address. For example, the camera management command packet for reverse mode use can include a slave address, a bit indicating a write command, a sub address, and any suitable number of bits of data to be written. In some embodiments, the length of the write data is equal to $2^{word\ count\ of\ packet\ header}-16\text{'d}3$ or any other suitable value. In some embodiments, the camera management command for reverse mode use can include a slave address, a bit indicating a read command, a sub address, and an amount of bytes to be read. In some embodiments, a read response camera management command in reverse mode can include a slave address, a bit indicating a read operation, a sub address, and any suitable number of bytes of read data.

At block 306, the data receiver 122 can receive image data from the image sensor via the camera serial interface link. Image data, as referred to herein, can include any information corresponding to pixels for digital photography. In some embodiments, image data is captured using row by row techniques. Accordingly, each row of pixel data corresponding to a digital image captured by an image sensor can be transmitted in a single data packet. In some examples, an image sensor generates a number of data packets of image data equal to a number of rows of resolution of a digital image. In some embodiments, the data receiver 122 generates idle times between transmitting each row of pixel data and between transmitting each separate image. In some examples, camera management commands can be transmitted from the transmitter 120 to the data receiver 122 during these idle times.

The process flow diagram of FIG. 3 is not intended to indicate that the operations of the method 300 are to be executed in any particular order, or that all of the operations of the method 300 are to be included in every case. Additionally, the method 300 can include any suitable number of additional operations. For example, in some embodiments, the image sensor can connect to any number of sensors or devices using an I2C interface. The image sensor can use a mapper to perform read or write operations to the connected sensors and other I2C devices. In some examples, the sensors and other I2C devices are designated by a slave address and a sub address included in a camera management command. If the I2C devices generate a negative acknowledgment as a result of executing the camera management command from an application processor, the camera management command is sent back to the application processor with the packet header modified to include a bit from the data type field, virtual channel field, or unused reserved data field indicating the negative acknowledgment. In some embodiments, auxiliary sensors can be mapped to the image sensor using a bridge. Moreover, in some embodiments, the camera management command can initiate a firmware modification corresponding to the image sensor.

Figure 4:
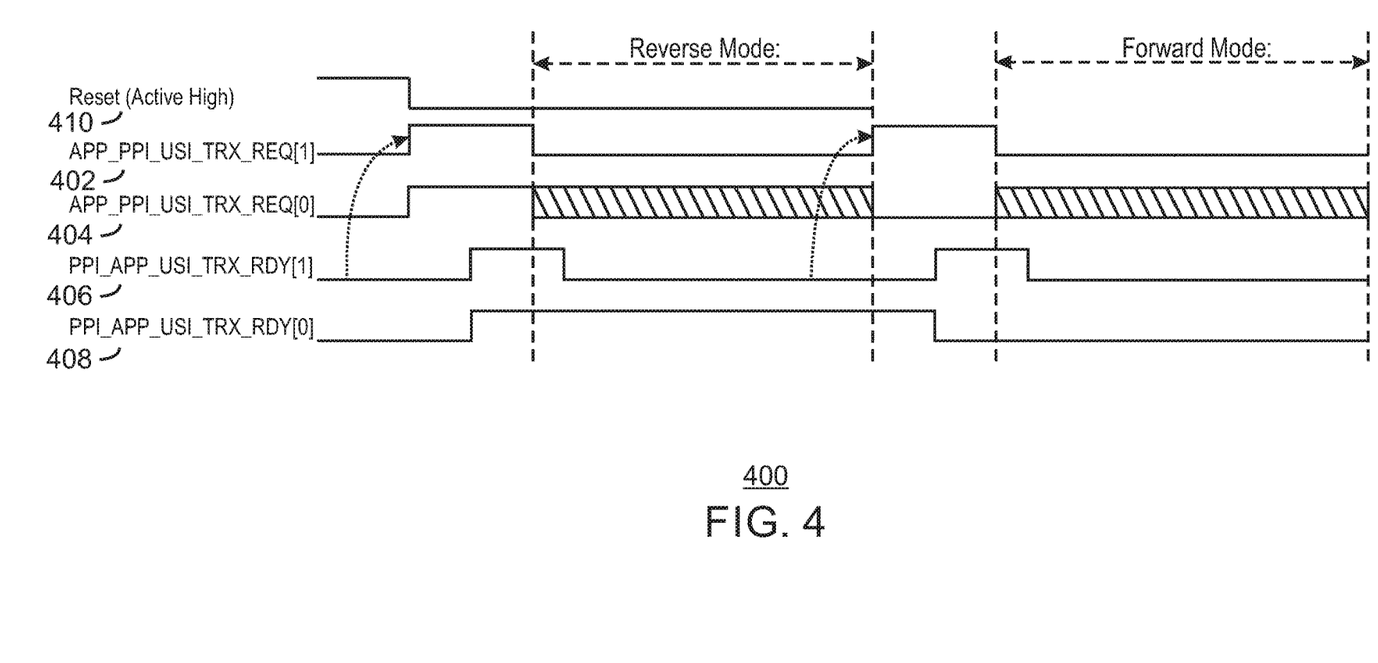
FIG. 4 illustrates a timing diagram of an example processor that can transmit data to an image sensor.

FIG. 4 illustrates a timing diagram of an example processor that can transmit data to an image sensor. In some embodiments, the timing diagram illustrated in FIG. 4 can correspond to functionalities implemented by the computing system 100 of FIG. 1.

In FIG. 4, the timing diagram 400 depicts five signals API_PPI_USI_TRX_REQ[1] 402, API_PPI_USI_TRX_REQ[0] 404, PPI_APP_USI_TRX_RDY[1] 406, PPI_APP_USI_TRX_RDY[0] 408, and reset 410. In some embodiments, a processor and image sensor enter a reverse mode when the reset signal 410 switches from a high state to a low state, the API_PPI_USI_TRX_REQ[1] 402 and API_PPI_USI_TRX_REQ[0] 404 signals transition from a low state to a high state and PPI_APP_USI_TRX_RDY[1] 406 and PPI_APP_USI_TRX_RDY[0] 408 transition from a low state to a high state. In some embodiments, the processor and image sensor operate in a reverse mode until API_PPI_USI_TRX_REQ[1] 402 and API_PPI_USI_TRX_REQ[0] 404 signals transition from a high state to a low state and PPI_APP_USI_TRX_RDY[1] 406 and PPI_APP_USI_TRX_RDY[0] 408 transition from a high state to a low state.

In some embodiments, the camera serial interface can alternate between a reverse mode and a forward mode. For example, a processor can transmit a camera management command to an image sensor in reverse mode and the image sensor can transmit image data to the processor in forward mode. In some embodiments, a processor requests a physical port to be enabled as a transmitter using a PHY protocol interface (PPI) and the processor waits for confirmation prior to executing a write command. In some examples, an image sensor supporting the transmittal of camera management commands and image data via the same camera serial interface is powered up as part of a system reset or power cycle and the image sensor enters an initial state corresponding to the reverse mode. This enables the image sensor to receive configuration information and instructions from a processor prior to capturing image data.

In some embodiments, when the physical interface of a processor is ready to transmit a camera management command to the image sensor, a bit is set in a register to indicate data is to be transmitted to an image sensor. A second bit in a second register may also be set to indicate the mode in which the processor and image sensor are to operate. For example, the second bit can indicate that the processor and image sensor are to operate in reverse mode or forward mode. In some examples, the physical interface of a processor or image sensor may request time to calibrate and turn around the data link used by the physical interfaces.

In some embodiments, the reverse mode can enable the transfer of firmware from the processor to an image sensor using a high bandwidth bidirectional data link rather than a low bandwidth data link such as an I2C interface. The reverse mode can also enable power savings by using a separate power island for auxiliary sensors and components attached to an image sensor.

In some embodiments, the processor can write to one or more registers in an image sensor to periodically switch from a forward mode to a reverse mode in response to detecting that the processor is to update settings or firmware for the image sensor. For example, the processor can modify settings corresponding to autofocus, white balance, exposure, and the like. In some embodiments, the transition between a reverse mode and forward mode can occur during a line blank or frame blank between the transmission of image data. A line blank, as referred to herein, is an idle period of time between data packets corresponding to rows of pixel data. For example, each row of pixels of an image may be transmitted in a separate data packet. Between each data packet, the camera serial interface may include a line blank or idle period of time. A frame blank, as referred to herein, includes an idle period of time between the last data packet corresponding to image data from a first image and the first data packet corresponding to image data from a second image.

In some embodiments, one register of the image sensor enables switching to reverse mode during line blanking once every N frames. In some examples, the most significant bit indicates switching to reverse mode and the least significant bits indicate the number of frames to be transmitted before transitioning to reverse mode. In some embodiments, a second register of the image sensor enables switching to reverse mode during frame blanking once every N long packets. In some embodiments, switching or transitioning to reverse mode based on a number of frames or number of long packets is mutually exclusive. In some examples, if both are enabled, switching to reverse mode based on a number of frames takes precedence. In some examples, a default reset setting in an image sensor can include switching to reverse mode once during each frame blank. In some embodiments, the image sensor can stream image data indefinitely until the image sensor is powered down in response to detecting the register corresponding to reversing mode after a number of frames and the register corresponding to reversing mode after a number of long packets are both set to a particular value.

In some embodiments, a processor can transmit a series of read commands to an image sensor. In some examples, the image sensor can store a number of read commands in a buffer. If the number of read commands exceeds the storage of a buffer in an image sensor, the processor can write or store a value in the image sensor indicating the image sensor register is to complete remaining read commands after the read commands stored in a buffer are executed by the image sensor.

In some embodiments, a processor can write to a register in the image sensor indicating that a delay is to be implemented between switching modes. In some examples, prior to enabling a switch from a forward mode to a reverse mode, a processor can configure a number of words of data per byte clock delay prior to initiating an image sensor physical interface request sequence to switch to the forward mode using additional bits in a data packet.

Figure 5A:
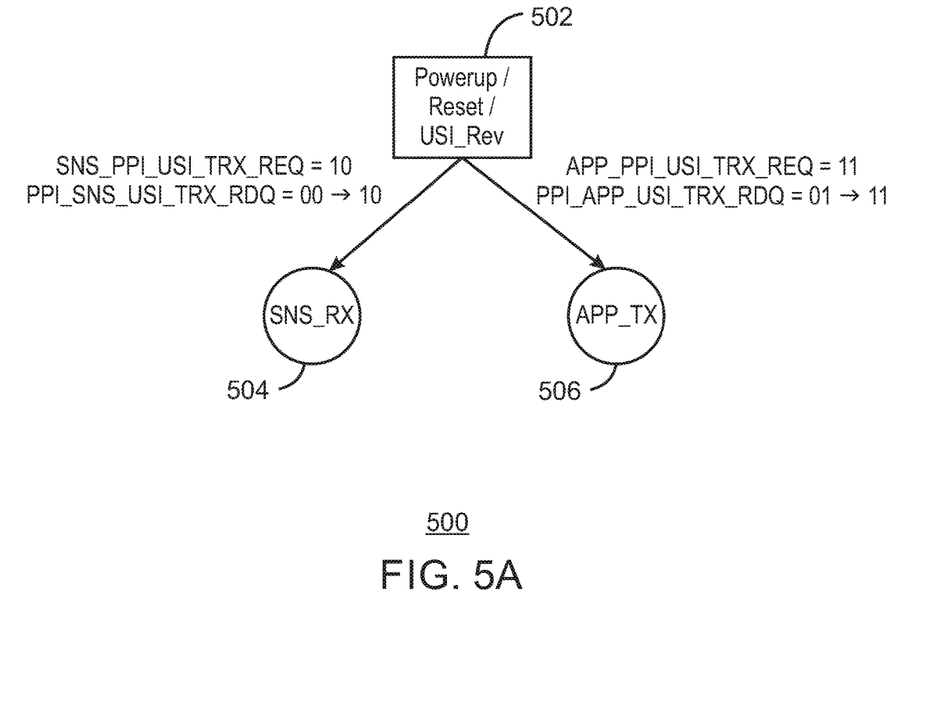
FIG. 5A illustrates a state diagram for transitioning between modes of data transfers for an image sensor and an application processor.

FIG. 5A illustrates a state diagram for transitioning between modes of data transfers for an image sensor and an application processor. In some embodiments, the initial power-up or reset state 502 can enter a reverse mode including an image sensor receive state 504 and a sensor transmit state 506. During the reverse mode, a processor can transmit configuration data, firmware data, read requests based on a frequency of line blanks or frame blanks. In some embodiments, a write operation from a processor to a register of an image sensor can indicate a transition from the reverse mode to a forward mode.

Figure 5B:
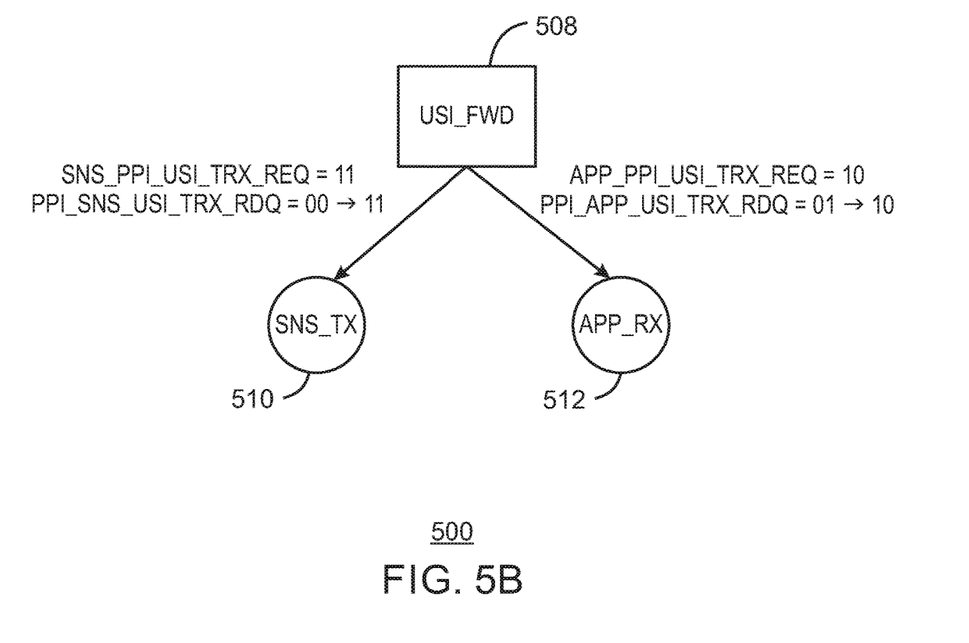
FIG. 5B illustrates a state diagram for transitioning a processor and an image sensor to a forward mode.

FIG. 5B illustrates a state diagram for transitioning a processor and an image sensor to a forward mode. In some embodiments, during forward mode 508, a sensor image can transmit data to a processor during a transmit state 510 and a processor can receive image data from the image sensor during a receive state 512. During forward mode, long data packets containing read data from the image sensor are transmitted to the processor. The read data can include image data corresponding to pixel values for an image. The forward mode can transition to a reverse mode based on modified data packet header information such as a modified data type value, reserved data bit value, and the like.

Figure 6:
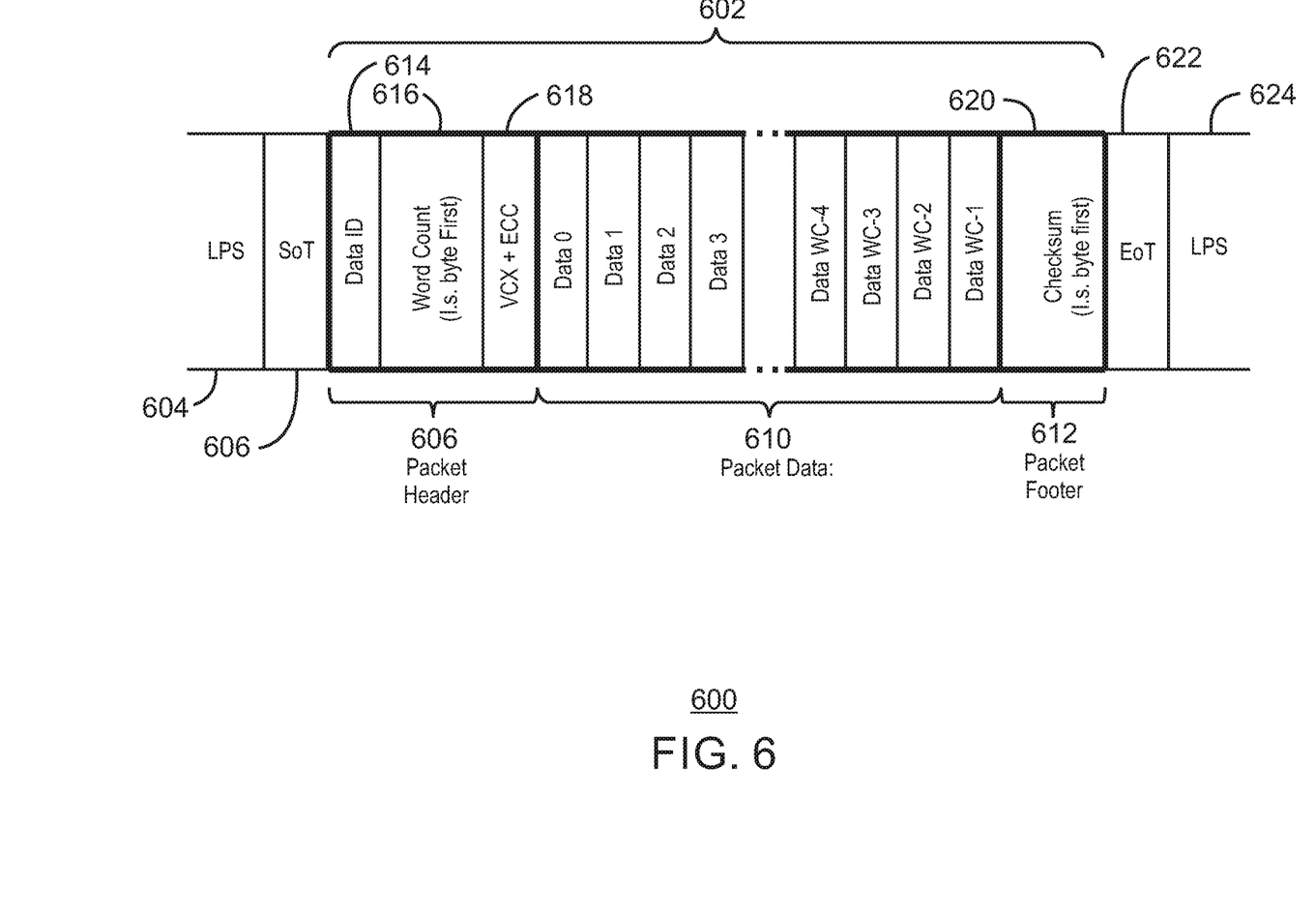
FIG. 6 is a block diagram illustrating a data packet using a D-PHY physical interface.

FIG. 6 is a block diagram illustrating a data packet using a D-PHY physical interface. In some embodiments, the data packet 602 can be transmitted between a processor and an image sensor following a low power signal (LPS) 604 and a start of transmission time period 606. The data packet 602 includes a packet header 608, packet data 610, and a packet footer 612. The packet header 608 can include a data identifier field 614, a word count field 616, and a virtual channel extension with an error correction code value 618. In some embodiments, various bits of the data identifier field 614 can be modified to indicate if the packet data 610 corresponds to a camera management command or image data. For example, virtual channel bits in the data identifier field 614, a data type value in the data identifier field 614, or unused reserved data bits in the data identified field 614 can be used to indicate if the packet data 610 includes a camera management command or image data. In some embodiments, the word count field 616 indicates the end of the packet payload. In some embodiments, the virtual channel extension with an error correction code value 618 indicates the D-PHY physical layer option for transmitting the data packet 602 and enables correction of one bit errors in the packet header 608 and detection of two bit errors in the packet header 608. In some examples, the packet footer 612 includes a checksum value 620 that indicates if an error exists in the packet data 610. The data packet 602 can be followed by any suitable end of transmission time period 622 and low power signal 624.

Figure 7:
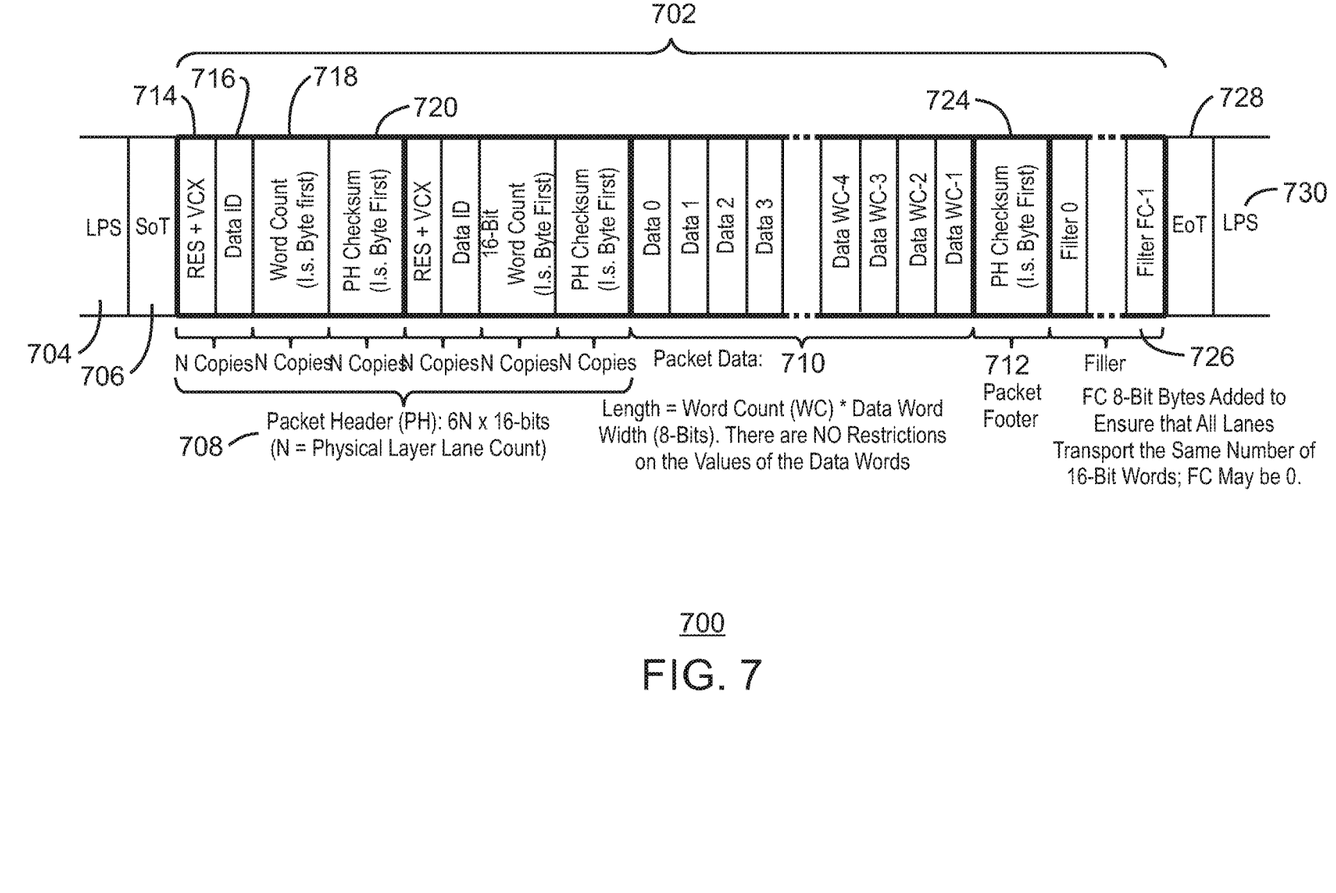
FIG. 7 is a block diagram illustrating a data packet using a C-PHY physical interface.

FIG. 7 is a block diagram illustrating a data packet using a C-PHY physical interface. In some embodiments, the data packet 702 can be transmitted between a processor and an image sensor following a low power signal (LPS) 704 and a start of transmission time period 706. The data packet 702 includes a packet header 708, packet data 710, and a packet footer 712. The packet header 708 can include a virtual channel extension and reserved data field 714, a data identifier field 716, a word count field 718, and a checksum value 720. In some embodiments, any number of copies of the virtual channel extension and reserved data field 714, data identifier field 716, word count field 718, and checksum value 720 can precede the packet data 710, wherein the copies are separated by a sync word 722. In some examples, the number of copies of is equal to a number of data lanes in a camera serial interface link.

In some embodiments, various bits of the data identifier field 716 can be modified to indicate if the packet data 710 corresponds to a camera management command or image data. For example, virtual channel bits in the data identifier field 716, a data type value in the data identifier field 716, or unused reserved data bits in the data identified field 716 can be used to indicate if the packet data 710 includes a camera management command or image data. In some embodiments, the word count field 718 indicates the end of the packet payload. In some embodiments, the virtual channel extension and reserved data field 714 indicates the C-PHY physical layer option for transmitting the data packet 702. The checksum value 720 detects multi-bit errors in packet header 708. In some examples, the packet footer 712 includes a checksum value 724 that indicates if an error exists in the packet data 710. The data packet 702 can also include filler data 726 to ensure that data lanes in the camera serial interface transport the same number of words of data. In some examples, the data picketer 702 can be followed by any suitable end of transmission time period 728 and low power signal 730.

Figure 8:
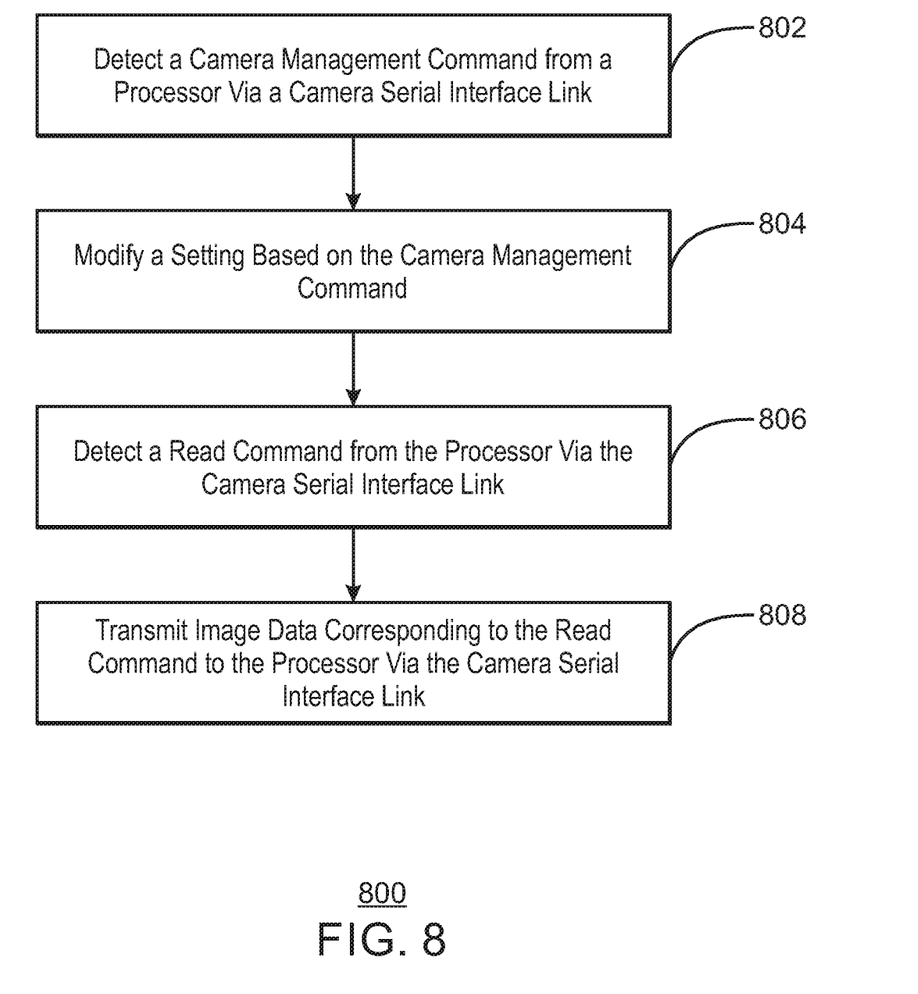
FIG. 8 is an example process flow diagram for transmitting image data in response to a camera management commands via a single camera serial interface link.

FIG. 8 is an example process flow diagram for transmitting image data in response to a camera management commands via a single camera serial interface link. The method 800 can be implemented with any suitable input device, such as an image sensor or input device 116 of FIG. 1.

At block 802, an image sensor can detect a camera management command from a processor via a camera serial interface link. In some examples, the camera management command can include any suitable read command, write command, firmware update command, auxiliary sensor command, and the like. An auxiliary sensor can include any suitable sensor, such as a gyroscope, an optical image stabilization sensor, an auto focus sensor, radar, and an ultrasonic sensor, among others, that can modify settings used by the image sensor to capture image data. In some embodiments, the image sensor can detect a bundle of any number of camera management commands in a single data packet or sequential data packets. In some embodiments, the camera management commands can correspond to a single write to a random location, a single write to a current location, a single read from a random location, a single read from a current location, a sequential read operation from random locations, and a sequential read operation from a current location.

In some embodiments, the camera management commands are mapped into camera management command packets illustrated in FIGS. 6 and 7 above. In some embodiments, the camera management commands use byte-wise operations that include any suitable bit filler, such as 8'h00 filler, to ensure lane alignment in a data link of the physical interfaces. The 8'h00 filler can ensure 16 bit (or wider) data paths are properly aligned. The 16 bit word count for camera management commands can map to byte-wise size of the camera management commands content in long packet data.

At block 804, the image sensor can modify a setting based on the camera management command. For example, the image sensor can modify a setting that corresponds to an auxiliary sensor such as an auto focus sensor, an optical image stabilization sensor, or a gyroscope sensor. The auxiliary sensors can modify the exposure time corresponding to an image sensor, a focal point of the image sensor, and the like.

At block 806, the image sensor can detect a read command from the processor via the camera serial interface link. For example, the image sensor can detect a read command in a data packet subsequent to a data packet comprising a camera management command that modifies a setting of the image sensor or an auxiliary sensor.

At block 808, the image sensor can transmit image data corresponding to the read command to the processor via the camera serial interface link. For example, the image sensor can access local memory or registers to retrieve and transmit image data requested by a processor. The image data can be transmitted from the image sensor to the processor via the camera serial interface used for transmitting camera management commands.

The process flow diagram of FIG. 8 is not intended to indicate that the operations of the method 800 are to be executed in any particular order, or that all of the operations of the method 800 are to be included in every case. Additionally, the method 800 can include any suitable number of additional operations.

EXAMPLE 1

In some examples, a system for transmitting data comprises a processor to detect a camera management command to transmit to an image sensor via a camera serial interface link, transmit the camera management command to the image sensor via the camera serial interface link, and receive image data from the image sensor via the camera serial interface link.

In some examples, the processor can modify a PHY protocol interface connecting the processor to the camera serial interface link to enable transitioning the camera serial interface link from a reverse mode to a forward mode. Alternatively, or in addition, the forward mode can include transmitting the image data from the image sensor to the processor, and the reverse mode can include transmitting the image data from the processor to the image sensor. Alternatively, or in addition, the processor can be an application processor or a system on a chip. Alternatively, or in addition, the camera management command can modify a setting of the image sensor. Alternatively, or in addition, the camera management command can modify a setting of an auto focus sensor, an optical image stabilization sensor, or a gyroscope sensor. Alternatively, or in addition, the processor can transmit the camera management command to the image sensor via the camera serial interface link by modifying a packet header corresponding to a data packet encapsulating the camera management command. Alternatively, or in addition, the processor can receive the image data in response to transmitting a read command embedded in a packet header from the processor to the image sensor via the camera serial interface link. Alternatively, or in addition, the packet header can include a slave address, a bit indicating a read command or a write command, a sub address, and a number of bytes to be accessed by the read command. Alternatively, or in addition, the camera serial interface link can include a bidirectional differential interface comprising a two-wire clock lane and one or more two-wire data lanes. Alternatively, or in addition, the camera serial interface link can include a bidirectional differential interface comprising one or more two-wire data lanes. Alternatively, or in addition, the system can include a physical interface to specify a transmission medium, input/output circuitry, and a clocking mechanism to enable capturing a data packet comprising the camera management command or the image data. Alternatively, or in addition the processor can indicate a delay between transitioning from a reverse mode to a forward mode or a forward mode to a reverse mode. Alternatively, or in addition, the processor can combine the camera management command with a filler value to generate a camera management command packet. Alternatively, or in addition, the image sensor can capture the image data based on a setting specified in the camera management command. Alternatively, or in addition, the camera management command can initialize the image sensor and instructs the image sensor to detect the image data. Alternatively, or in addition, the processor can transition from the reverse mode to the forward mode by storing a transition value in a register of the image sensor, the transition value to indicate transitioning from the reverse mode to the forward mode during a line blank. Alternatively, or in addition, the camera management command can initiate a firmware modification corresponding to the image sensor. Alternatively, or in addition, the processor can receive the image data in response to the processor transmitting a series of read commands to the image sensor.

EXAMPLE 2

In some examples, a method for transmitting data includes detecting a camera management command to transmit to an image sensor via a camera serial interface link, transmitting the camera management command to the image sensor via the camera serial interface link, and receiving image data from the image sensor via the camera serial interface link.

In some examples, the method includes modifying a PHY protocol interface connecting the processor to the camera serial interface link to enable transitioning the camera serial interface link from a reverse mode to a forward mode. Alternatively, or in addition, the forward mode can include transmitting the image data from the image sensor to the processor, and the reverse mode can include transmitting the image data from the processor to the image sensor. Alternatively, or in addition, the processor can be an application processor or a system on a chip. Alternatively, or in addition, the camera management command can modify a setting of the image sensor. Alternatively, or in addition, the camera management command can modify a setting of an auto focus sensor, an optical image stabilization sensor, or a gyroscope sensor. Alternatively, or in addition, the method can include transmitting the camera management command to the image sensor via the camera serial interface link by modifying a packet header corresponding to a data packet encapsulating the camera management command. Alternatively, or in addition, the method can include receiving the image data in response to transmitting a read command embedded in a packet header from the processor to the image sensor via the camera serial interface link. Alternatively, or in addition, the packet header can include a slave address, a bit indicating a read command or a write command, a sub address, and a number of bytes to be accessed by the read command. Alternatively, or in addition, the camera serial interface link can include a bidirectional differential interface comprising a two-wire clock lane and one or more two-wire data lanes. Alternatively, or in addition, the camera serial interface link can include a bidirectional differential interface comprising one or more two-wire data lanes. Alternatively, or in addition, the system can include a physical interface to specify a transmission medium, input/output circuitry, and a clocking mechanism to enable capturing a data packet comprising the camera management command or the image data. Alternatively, or in addition the method can include indicating a delay between transitioning from a reverse mode to a forward mode or a forward mode to a reverse mode. Alternatively, or in addition, the method can include combining the camera management command with a filler value to generate a camera management command packet. Alternatively, or in addition, the image sensor can capture the image data based on a setting specified in the camera management command. Alternatively, or in addition, the camera management command can initialize the image sensor and instructs the image sensor to detect the image data. Alternatively, or in addition, the method can include transitioning from the reverse mode to the forward mode by storing a transition value in a register of the image sensor, the transition value to indicate transitioning from the reverse mode to the forward mode during a line blank. Alternatively, or in addition, the camera management command can initiate a firmware modification corresponding to the image sensor. Alternatively, or in addition, the method can include receiving the image data in response to the processor transmitting a series of read commands to the image sensor.

EXAMPLE 3

In some examples, a system for transmitting data comprises an image sensor to detect a camera management command from a processor via a camera serial interface link, modify a setting based on the camera management command, detect a read command from the processor via the camera serial interface link, and transmit image data corresponding to the read command to the processor via the camera serial interface link. In some examples, the camera management command modifies a setting of the image sensor. In some examples, the setting corresponds to an auto focus sensor, an optical image stabilization sensor, or a gyroscope sensor.

Although an example embodiment of the disclosed subject matter is described with reference to block and flow diagrams in FIGS. 1-8, persons of ordinary skill in the art will readily appreciate that many other methods of implementing the disclosed subject matter may alternatively be used. For example, the order of execution of the blocks in flow diagrams may be changed, and/or some of the blocks in block/flow diagrams described may be changed, eliminated, or combined.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

Program code may represent hardware using a hardware description language or another functional description language which essentially provides a model of how designed hardware is expected to perform. Program code may be assembly or machine language or hardware-definition languages, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Program code may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any tangible mechanism for storing, transmitting, or receiving information in a form readable by a machine, such as antennas, optical fibers, communication interfaces, etc. Program code may be transmitted in the form of packets, serial data, parallel data, etc., and may be used in a compressed or encrypted format.

Program code may be implemented in programs executing on programmable machines such as mobile or stationary computers, personal digital assistants, set top boxes, cellular telephones and pagers, and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. A system for transmitting data comprising:
a processor to:
detect a camera management command to transmit to an image sensor via a camera serial interface link;
transmit the camera management command to the image sensor via the camera serial interface link;
modify a PHY protocol interface connecting the processor to the camera serial interface link to enable transitioning the camera serial interface link from a reverse mode to a forward mode;
transition from the reverse mode to the forward mode by storing a transition value in a register of the image sensor, the transition value to indicate transitioning from the reverse mode to the forward mode during a line blank; and
receive image data from the image sensor via the camera serial interface link.

2. The system of claim 1, wherein the forward mode comprises transmitting the image data from the image sensor to the processor, and the reverse mode comprises transmitting the image data from the processor to the image sensor.

3. The system of claim 1, wherein the processor is an application processor or a system on a chip.

4. The system of claim 1, wherein the camera management command modifies a setting of the image sensor.

5. The system of claim 1, wherein the camera management command modifies a setting of an auto focus sensor, an optical image stabilization sensor, or a gyroscope sensor.

6. The system of claim 1, wherein the processor is to transmit the camera management command to the image sensor via the camera serial interface link by modifying a packet header corresponding to a data packet encapsulating the camera management command.

7. The system of claim 1, wherein the processor is to receive the image data in response to transmitting a read command embedded in a packet header from the processor to the image sensor via the camera serial interface link.

8. The system of claim 6, wherein the packet header comprises a slave address, a bit indicating a read command or a write command, a sub address, and a number of bytes to be accessed by the read command.

9. The system of claim 1, wherein the camera serial interface link comprises a bidirectional differential interface comprising a two-wire clock lane and one or more two-wire data lanes.

10. The system of claim 1, wherein the camera serial interface link comprises a bidirectional differential interface comprising one or more two-wire data lanes.

11. The system of claim 1, wherein the system comprises a physical interface to specify a transmission medium, input/output circuitry, and a clocking mechanism to enable capturing a data packet comprising the camera management command or the image data.

12. The system of claim 1, wherein the processor is to indicate a delay between transitioning from the reverse mode to the forward mode or the forward mode to the reverse mode.

13. The system of claim 1, wherein the processor is to combine the camera management command with a filler value to generate a camera management command packet.

14. The system of claim 1, wherein the image sensor is to capture the image data based on a setting specified in the camera management command.

15. The system of claim 1, wherein the camera management command is to initialize the image sensor and to instruct the image sensor to detect the image data.

16. The system of claim 1, wherein the camera management command is to initiate a firmware modification corresponding to the image sensor.

17. The system of claim 1, wherein the processor is to receive the image data in response to the processor transmitting a series of read commands to the image sensor.

18. A system for transmitting data comprising:
an image sensor to:
detect a camera management command from a processor via a camera serial interface link;
modify a setting based on the camera management command;
detect a read command from the processor via the camera serial interface link;
modify a PHY protocol interface connecting the processor to the camera serial interface link to enable transitioning the camera serial interface link from a reverse mode to a forward mode;
transition from a forward mode to a reverse mode by storing a transition value in a register of the image sensor, the transition value to indicate transitioning from the forward mode to the reverse mode during a line blank; and
transmit image data corresponding to the read command to the processor via the camera serial interface link.

19. The system of claim 18, wherein the camera management command modifies a setting of the image sensor.

20. The system of claim 19, wherein the setting corresponds to an auto focus sensor, an optical image stabilization sensor, or a gyroscope sensor.

21. A method for transmitting data comprising:
detecting, via a processor, a camera management command to transmit to an image sensor via a camera serial interface link;
transmitting, via the processor, the camera management command to the image sensor via the camera serial interface link;
modifying a PHY protocol interface connecting the processor to the camera serial interface link to enable transitioning the camera serial interface link from a reverse mode to a forward mode;
transitioning from the reverse mode to the forward mode by storing a transition value in a register of the image sensor, the transition value to indicate transitioning from the reverse mode to the forward mode during a line blank; and
receiving, via the processor, image data from the image sensor via the camera serial interface link.

22. The method of claim 21, wherein the forward mode comprises transmitting the image data from the image sensor to the processor, and the reverse mode comprises transmitting the image data from the processor to the image sensor.

* * * * *